(12) United States Patent
Tanigawa et al.

(10) Patent No.: US 9,498,916 B2
(45) Date of Patent: Nov. 22, 2016

(54) CHUCK DEVICE AND HOOP WINDING DEVICE

(71) Applicant: MURATA MACHINERY, LTD., Kyoto-shi, Kyoto (JP)

(72) Inventors: Motohiro Tanigawa, Kyoto (JP); Tadashi Uozumi, Kyoto (JP); Daigoro Nakamura, Kyoto (JP); Ken Hatta, Aichi (JP)

(73) Assignee: MURATA MACHINERY, LTD., Kyoto (JP)

( * ) Notice: Subject to any disclaimer, the term of this patent is extended or adjusted under 35 U.S.C. 154(b) by 403 days.

(21) Appl. No.: 14/160,025

(22) Filed: Jan. 21, 2014

(65) Prior Publication Data
US 2014/0224918 A1 Aug. 14, 2014

(30) Foreign Application Priority Data

Feb. 8, 2013 (JP) ................. 2013-023768

(51) Int. Cl.
*B65H 59/28* (2006.01)
*B29C 53/80* (2006.01)
(52) U.S. Cl.
CPC .......... *B29C 53/8016* (2013.01); *B65H 59/28* (2013.01); *B29C 2053/8025* (2013.01)
(58) Field of Classification Search
CPC ....... B29C 41/36; B29C 53/56; B29C 53/58; B29C 53/585; B29C 53/60; B29C 53/602; B29C 53/66; B29C 53/68; B29C 53/70; B29C 53/824; B29C 53/825; B29C 53/8025
See application file for complete search history.

(56) References Cited

U.S. PATENT DOCUMENTS

| | | | | |
|---|---|---|---|---|
| 3,112,234 A | * | 11/1963 | Krupp | B21D 51/24 156/169 |
| 3,523,300 A | * | 8/1970 | Shinkai | D01H 4/08 57/409 |
| 4,010,054 A | * | 3/1977 | Bradt | B29C 53/566 156/173 |
| 4,112,661 A | * | 9/1978 | Suzuki | D01H 4/44 57/263 |
| 4,693,429 A | * | 9/1987 | Billard | B65H 57/00 242/157 R |
| 4,892,764 A | * | 1/1990 | Drain | B29C 35/02 156/161 |
| 5,135,596 A | * | 8/1992 | Pabsch | B29C 53/566 156/156 |
| 5,499,772 A | | 3/1996 | Maeda et al. | |
| 6,074,595 A | * | 6/2000 | Eisberg | B29C 53/582 156/169 |
| 6,332,311 B1 | * | 12/2001 | Todo | B65H 54/705 242/128 |
| 7,185,778 B1 | * | 3/2007 | Palley | B65D 88/14 220/1.5 |
| 8,403,251 B2 | | 3/2013 | Uozumi et al. | 242/419.3 |
| 2003/0000619 A1 | * | 1/2003 | Nakamura | B60C 1/00 152/525 |
| 2003/0157280 A1 | * | 8/2003 | Boissonnat | B29C 47/0021 428/34.1 |
| 2009/0065625 A1 | * | 3/2009 | Uozumi | B29C 53/828 242/487.2 |
| 2009/0314418 A1 | * | 12/2009 | Uozumi | B29C 53/64 156/172 |
| 2010/0032510 A1 | * | 2/2010 | Tanigawa | B29C 53/602 242/430 |
| 2014/0072740 A1 | * | 3/2014 | Zaiser | C03C 25/14 428/35.7 |

FOREIGN PATENT DOCUMENTS

EP 1 369 371 A3 5/2004
EP 2 407 406 A3 2/2013

* cited by examiner

*Primary Examiner* — Emmanuel M Marcelo
(74) *Attorney, Agent, or Firm* — DLA Piper LLP (US)

(57) ABSTRACT

A chuck device of a fiber bundle includes a pair of hands adapted to be opened/closed. The pair of hands includes a plurality of guides adapted to regulate and bend the fiber bundle under a closing state, and to release the fiber bundle under an opening state. Under the closing state, the plurality of guides holds the fiber bundle by being close to each other with tension applied on the fiber bundle.

14 Claims, 16 Drawing Sheets

CHUCK DEVICE AND HOOP WINDING DEVICE

CROSS-REFERENCE TO RELATED APPLICATIONS

This application claims priority under 35 U.S.C. 119 to Japanese Patent Application No. 2013-23768, filed on Feb. 8, 2013, which application is hereby incorporated by reference in its entirety.

BACKGROUND OF THE INVENTION

1. Field of the Invention

The present invention relates to an art of a chuck device adapted to hold fiber bundles and a hoop winding device including the same.

2. Description of Related Art

There is publicly known a filament winding apparatus (hereinafter appropriately referred to as a "FW apparatus") adapted to form a reinforcement layer by winding the fiber bundles around the liner (see U.S. Pat. No. 8,403,251, for example). The FW apparatus repeatedly performs a hoop winding by a hoop winding device and a helical winding by a helical winding device alternately with respect to a liner.

The hoop winding device and the helical winding device wind the fiber bundles around the liner while applying a prescribed tension on the fiber bundles. In the FW apparatus of U.S. Pat. No. 8,403,251, the tension of the fiber bundles is controlled by monitoring the tension of the fiber bundles.

BRIEF SUMMARY OF THE INVENTION

The hoop winding device includes a chuck device adapted to hold the fiber bundles at the start and at the end of hoop winding. At the start of the hoop winding, the fiber bundles are wound with respect to the liner under a state of being held by the chuck device. At the end of the hoop winding, the fiber bundles are cut by a cutter under the state of being held by the chuck device. After the hoop winding is finished, the chuck device maintains the state of holding the fiber bundles, and the hoop winding device retreats in an axial direction of the liner so as not to disturb a subsequent helical winding step or liner replacing step. In a case where the hoop winding is carried out by use of a plurality of the fiber bundles, the plurality of fiber bundles are collectively held to improve efficiency of the hoop winding.

However, high tension is applied on the fiber bundles that are held by the chuck device. Thus, the fiber bundles may fall out of the chuck device. In particular, when the fiber bundles are cut by the cutter or when the hoop winding device is moved in the axial direction of the liner, the fiber bundles may fall out of the chuck device since the tension varies. Furthermore, in a case where the chuck device holds the plurality of fiber bundles, some of the fiber bundles may fall out since holding force is not transmitted thereto.

The inventors have developed as a chuck device for holding the fiber bundles, a chuck device adapted to sandwich the fiber bundles with hands adapted to be opened/closed. Fluid pressure is used to open/close the hands, and by increasing the fluid pressure, a force for sandwiching the fiber bundles can be increased. However, the fluid pressure that can be supplied has a limit, and even if the force for sandwiching the fiber bundles was increased, the fiber bundles fell out of the chuck device in some cases when the tension of the fiber bundles was high. Furthermore, even when a member by which friction to the fiber bundles is increased was mounted to the hands, the fiber bundles fell out of the chuck device in some cases.

The present invention is made to solve the above-described problem. An advantage of the present invention is to provide a chuck device being capable of firmly holding the fiber bundle on which the tension is applied, and a hoop winding device.

The advantage to be accomplished by the present invention is as mentioned above. Next, means for providing such advantage will be described below.

A chuck device of a fiber bundle according to one embodiment of the invention includes a pair of hands adapted to be opened/closed. The pair of hands includes a plurality of guides adapted to regulate and bend the fiber bundle under a closing state, and to release the fiber bundle under an opening state. Under the closing state, the plurality of guides hold the fiber bundle by being close to each other with tension applied to the fiber bundle.

In another embodiment of the invention, the hand includes supporting bodies adapted to support the plurality of guides. Under the closing state, the guides are close to each other by the supporting bodies being elastically deformed with the tension applied on the fiber bundle.

In a further embodiment of the invention, the hand further includes a pad adapted to hold the fiber bundle by friction.

A hoop winding device according to a further embodiment of the invention includes the chuck device described above. The hoop winding device is adapted to rotate about a resting liner around which the fiber bundle is wound and to support in a freely rotating manner, a bobbin around which the fiber bundle is wound.

A hoop winding device according to a further embodiment of the invention is adapted to support a plurality of the bobbins. The chuck device is capable of simultaneously gripping a plurality of the fiber bundles for hoop winding.

A hoop winding device according to a further embodiment of the invention includes a cutter adapted to cut the fiber bundles for the hoop winding gripped by the chuck device.

According to the present invention, since the fiber bundle is held by use of the tension applied on the fiber bundle, in a case where the tension applied on the fiber bundle is high, force of holding the fiber bundle is increased accordingly. The fiber bundle thus can be firmly held.

Other features, elements, processes, steps, characteristics and advantages of the present invention will become more apparent from the following detailed description of embodiments of the present invention with reference to the attached drawings.

DETAILED DESCRIPTION OF EMBODIMENTS OF THE INVENTION

Figure 1:
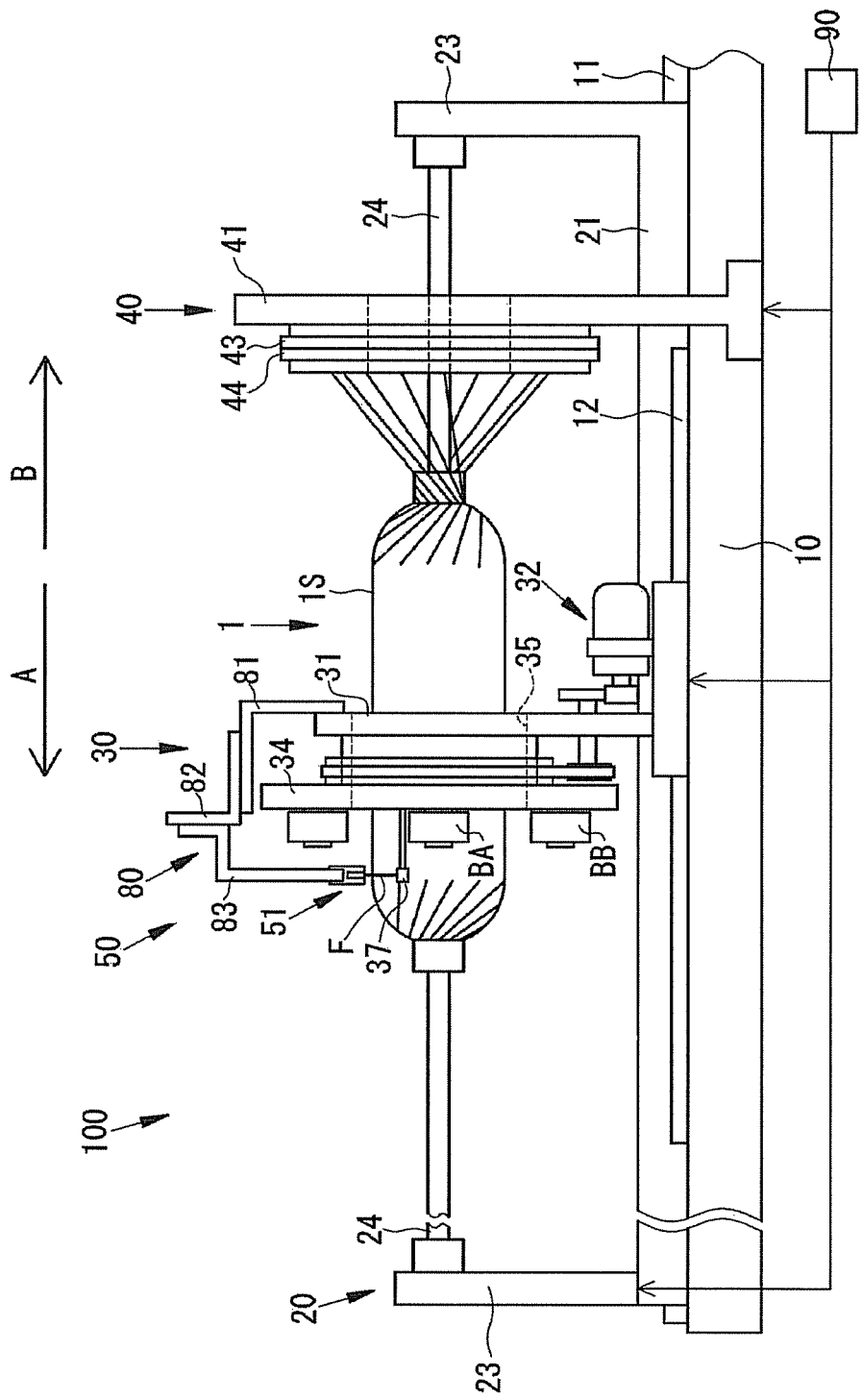
FIG. 1 is a side view of an FW apparatus according to one embodiment of the invention illustrating a state where a hoop winding device is at a winding start position.

A chuck device 51 and a hoop winding device 30 according to an embodiment of the present invention will be described with reference to the following drawings. First, an overall configuration of a filament winding apparatus (FW apparatus) 100 will be described with reference to FIG. 1. The FW apparatus 100 is adapted to wind a fiber bundle F impregnated with resin around a liner 1 by repeatedly carrying out hoop winding by the hoop winding device 30 and helical winding by the helical winding device 40 alternately with respect to the liner 1.

Arrows A, B illustrated in FIG. 1 indicate a front-back direction of the FW apparatus 100 and a transfer direction of the liner 1 in the helical winding. In the helical winding, the liner 1 reciprocates in the front-back direction of the FW apparatus 100, and hence the liner 1 may be transferred in the direction of the arrow A or may be transferred in the direction of the arrow B. In the following description, a leading-end side of the arrow A and a base-end side of the arrow A respectively indicate a front side and a back side for convenience sake.

The liner 1 is a base material that constitutes a pressure resistant container. The liner 1 is a substantially cylindrical hollow body made of a high-strength aluminum material, polyamide resin, or the like, for example. A pressure resistance property of the liner 1 is improved by winding a plurality of fiber bundles F around an outer circumferential surface 1S of the liner 1 and thereby a plurality of fiber layers are formed. In the following description, the liner 1 refers to both a state before winding the fiber bundles F and a state in the middle of winding the fiber bundles F. For example, the outer circumferential surface 1S of the liner 1 also refers to a surface of the wound fiber bundles F.

As illustrated in FIG. 1, the FW apparatus 100 includes a main base 10, a liner transfer device 20, a hoop winding device 30, a helical winding device 40 and a control section 90.

The main base 10 configures a base of the FW apparatus 100. A rail 11 for the liner transfer device is arranged at an upper part of the main base 10. The liner transfer device 20 is mounted on the rail 11 for the liner transfer device. A rail 12 for the hoop winding device is arranged parallel to the rail 11 for the liner transfer device at the upper part of the main base 10. The hoop winding device 30 is mounted on the rail 12 for the hoop winding device. The liner transfer device 20 and the hoop winding device 30 are capable of moving with respect to the main base 10 in the front-back direction. The helical winding device 40 is fixed to the main base 10.

The liner transfer device 20 is a device adapted to transfer the liner 1 while rotating the liner 1. The liner transfer device 20 rotates the liner 1 with the front-back direction of the FW apparatus 100 as a center axis. In addition, the liner transfer device 20 transfers the liner 1 in the front-back direction of the FW apparatus 100. The liner transfer device 20 includes a first base 21, a liner supporting frame 23 and a rotating shaft 24. Driving of the liner transfer device 20 is controlled by the control section 90.

A pair of the liner supporting frames 23 is arranged at an upper part of the first base 21. The rotating shaft 24 extends from the liner supporting frame 23 in the front-back direction. The liner 1 is mounted to the rotating shaft 24 and is rotated in one direction by a power mechanism.

The hoop winding device 30 forms a fiber layer by simultaneously winding a plurality of fiber bundles F around the outer circumferential surface 1S of the liner 1. The hoop winding device 30 performs the hoop winding such that a winding angle of the fiber bundle F is substantially perpendicular with respect to the front-back direction of the FW apparatus 100. The hoop winding device 30 includes a second base 31, a power mechanism 32, a hoop winding head 34 and a handling device 50. Driving of the hoop winding device 30 is controlled by the control section 90.

The hoop winding head 34 adapted to be rotated by the power mechanism 32 is arranged in the second base 31. The hoop winding head 34 includes an opening 35 where the liner 1 passes through a center thereof. A plurality of (four in the present embodiment) bobbins BA, BB, BC and BD are arranged around the opening 35 (see FIG. 2). The fiber bundle F is supplied from each of the bobbins BA, BB, BC and BD to an outer circumferential surface 1S of the liner 1. The power mechanism 32 rotates the hoop winding head 34 about a center axis of the liner 1.

In the hoop winding, the liner 1 is under a resting state without moving in an axial direction thereof or rotating. The hoop winding head 34 is rotated about the center axis of the liner 1 while causing the hoop winding device 30 to reciprocate along a center axis direction of the liner 1. In other words, the hoop winding device 30 simultaneously winds the plurality of fiber bundles F around the liner 1 by relatively rotating the hoop winding head 34 with respect to the liner 1. The hoop winding device 30 is capable of changing a winding mode of the fiber bundles F by adjusting a movement speed with respect to the liner 1 and a rotation speed of the hoop winding head 34. The handling device 50 will be described later in detail.

The helical winding device 40 forms a fiber layer by simultaneously winding the plurality of fiber bundles F around the outer circumferential surface 1S of the liner 1. The helical winding device 40 performs the helical winding such that a winding angle of the fiber bundles F is a predetermined value (for example, 0 to 60 degrees) with respect to the front-back direction of the FW apparatus 100. The helical winding device 40 includes a third base 41, a first helical winding head 43 and a second helical winding head 44. Driving the helical winding device 40 is controlled by the control section 90.

The third base 41 includes the first helical winding head 43 and the second helical winding head 44. The fiber bundles F are supplied from a plurality of bobbins to the first helical winding head 43 and the second helical winding head 44. The plurality of fiber bundles F are guided to the outer circumferential surface 15 of the liner 1. A plurality of nozzles are arranged towards the outer circumferential surface 15 of the liner 1 in each of the first helical winding head 43 and the second helical winding head 44 in a radial manner. The plurality of fiber bundles F are guided to the outer circumferential surface 15 of the liner 1 by the plurality of nozzles. The helical winding device 40 is fixed, and the helical winding is carried out with the liner 1 being transferred by the liner transfer device 20 while being rotated. The winding mode of the fiber bundles F can be freely changed by adjusting a transfer speed and a rotation speed of the liner 1.

Figure 2:
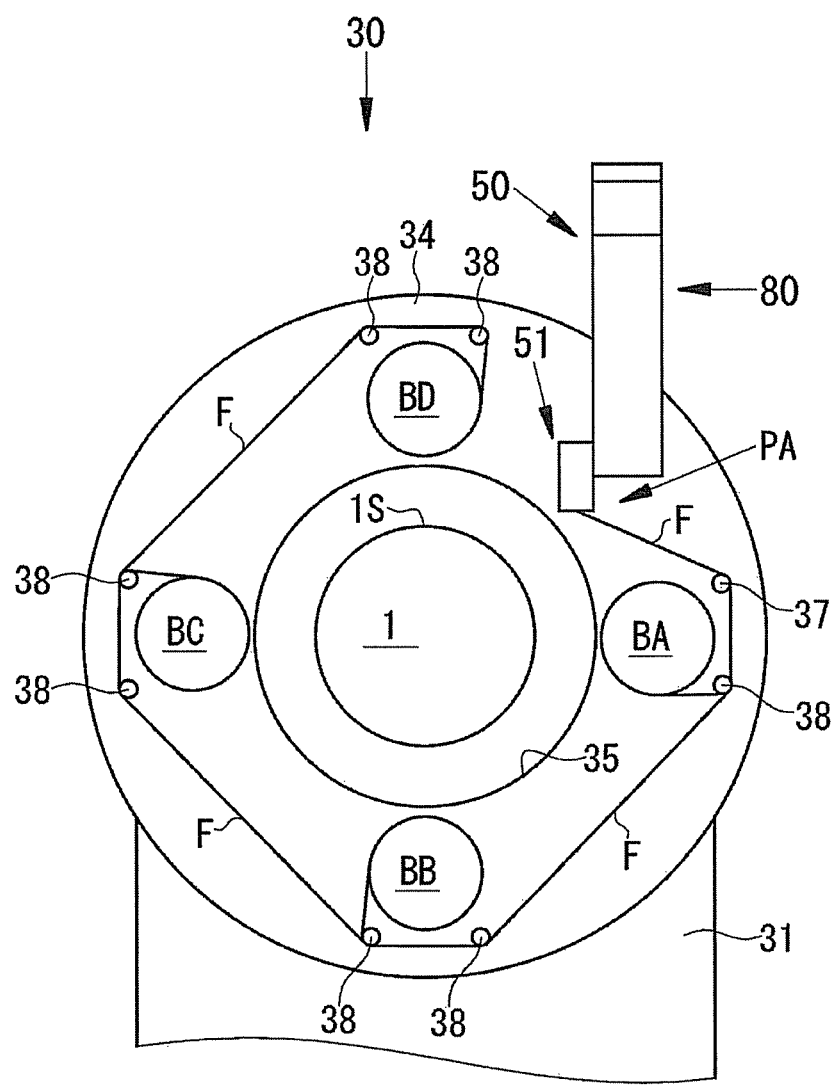
FIG. 2 is a view of the hoop winding device seen from a front direction of a liner under a state of FIG. 1.

Next, the hoop winding device 30 and the handling device 50, which are characteristic portions of the present invention, will be described in detail. As illustrated in FIG. 2, the hoop winding head 34 of the hoop winding device 30 includes the bobbins BA, BB, BC and BD, a fiber supply guide 37 and guide rollers 38. The bobbins BA, BB, BC and BD are arranged at equal intervals around the opening 35 of the hoop winding head 34. The guide rollers 38 gather four fiber bundles F from the bobbins BA, BB, BC and BD and guides the same to the fiber supply guide 37. The fiber supply guide 37 supplies the four fiber bundles F gathered by the guide rollers 38 to the outer circumferential surface 15 of the liner 1.

Figure 8:
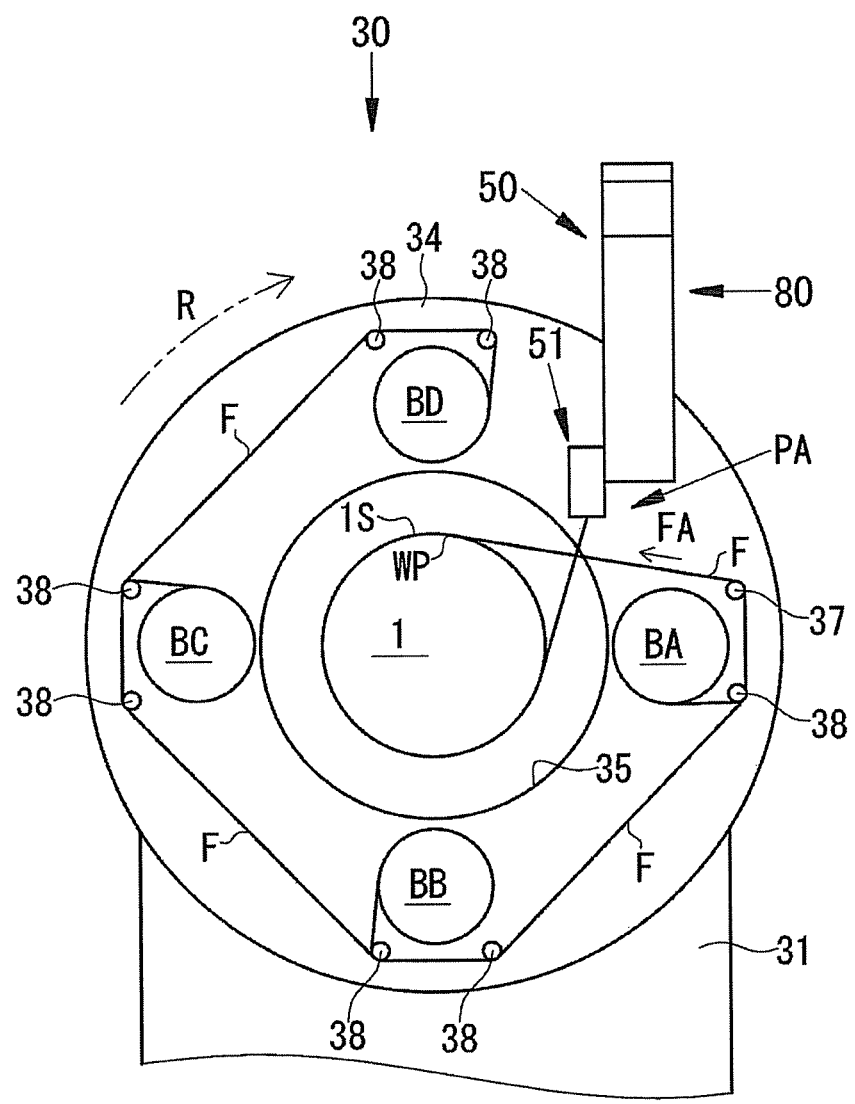
FIG. 8 is a view of the hoop winding device seen from a front direction of the liner under a state of FIG. 7.

The power mechanism 32 adapted to drive the hoop winding head 34 rotates the hoop winding head 34 in a direction of an arrow R in FIG. 8. Since the hoop winding head 34 is rotated, the fiber bundles F supplied from the fiber supply guide 37 are wound around the outer circumferential surface 1S of the liner 1. The fiber bundle F is supplied in a direction of an arrow FA that is a downstream side in a rotation direction of the hoop winding head 34. A direction FA in which the fiber bundles F are supplied is hereinafter referred to as a fiber supply direction FA. A base-end side of the arrow FA is an upstream side in the fiber supply direction FA, and a leading-end side of the arrow FA is a downstream side in the fiber supply direction FA. A position where the fiber bundles F guided from the fiber supply guide 37 to the liner 1 make contact with the outer circumferential surface 1S of the liner 1, and then the fiber bundles F are wound around the outer circumferential surface 1S is referred to as a winding position WP.

The power mechanism 32 is connected to the control section 90, and rotation and stop of the hoop winding head 34 are controlled based on a signal from the control section 90. A detecting section adapted to detect a rotation angle of the hoop winding head 34 and then to detect a position of the hoop winding head 34 is connected to the control section 90. An encoder, for example, is employed as the detecting section. The control section 90 is capable of specifying positions of the bobbins BA, BB, BC and BD, the winding position WP of the fiber bundles F, or the like by detecting the position of the hoop winding head 34. The control section 90 is also capable of stopping the rotation of the hoop winding head 34 by controlling the power mechanism 32 while detecting the position of the hoop winding head 34 such that the fiber supply guide 37 and the winding position WP of the fiber bundles F come to an arbitrary position.

Figure 3A:
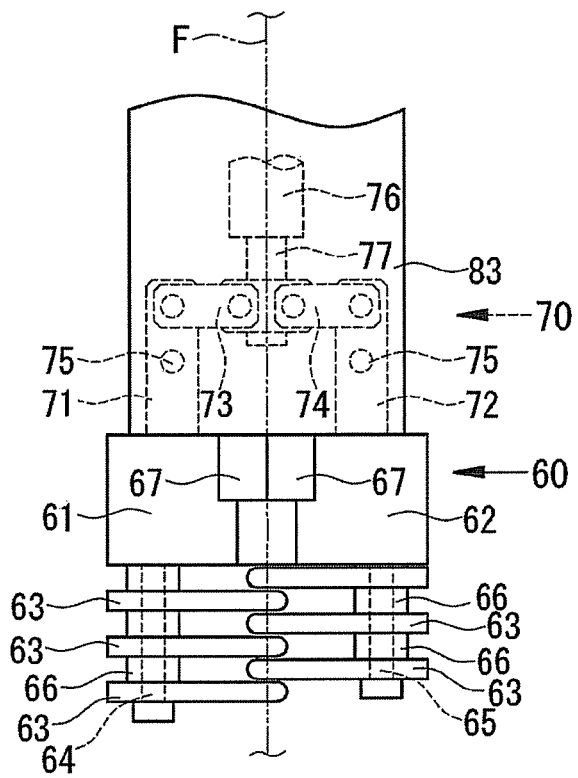
FIG. 3A is a front view of a chuck device.
Figure 3B:
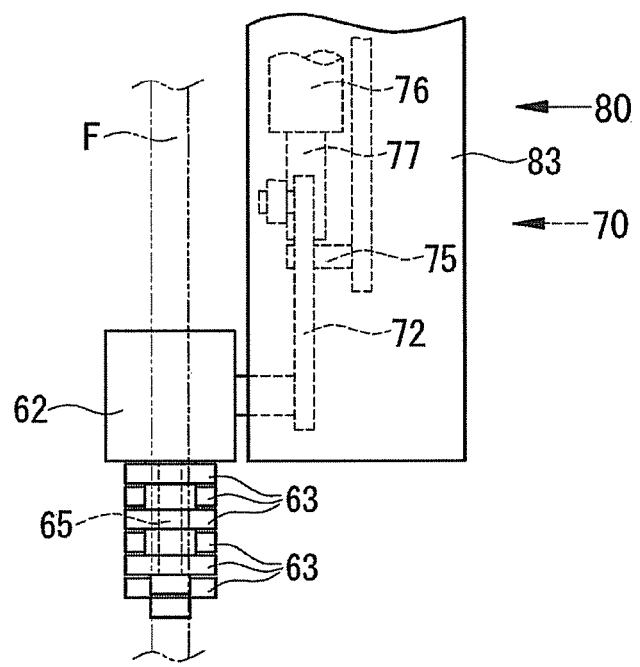
FIG. 3B is a side view of the chuck device.

Next, the handling device 50 will be described. As illustrated in FIG. 1, FIG. 2 and FIG. 3, the handling device 50 includes a chuck device 51 and an arm 80. At the start and at the end of the hoop winding, the chuck device 51 holds the fiber bundles F supplied from the fiber supply guide 37 of the hoop winding head 34. The arm 80 supports the chuck device 51 in a same side of the bobbins BA, BB, BC and BD and a fiber supply guide 37 of the hoop winding head 34.

As illustrated in FIG. 3, the chuck device 51 includes a hand 60 and a driving section 70. The hand 60 includes a first hand 61 and a second hand 62. The first hand 61 and the second hand 62 are switched by the driving section 70 between an opening state (see FIG. 4) and a closing state (see FIG. 5). Each of the first hand 61 and the second hand 62 includes a plurality of guides 63. The plurality of guides 63 are engaged with each other under the closing state and are released from each other under the opening state.

The driving section 70 opens/closes the first hand 61 and the second hand 62. A first lever 71 is connected to the first hand 61, and a second lever 72 is connected to the second hand 62. The first lever 71 and the second lever 72 are supported by a pin 75 in a freely rotating manner. An actuator includes a shaft 77 adapted to move forward and backward. The first lever 71 is connected to the shaft 77 via a third lever 73. The second lever 72 is connected to the shaft 77 via a fourth lever 74. Since the shaft 77 of the actuator 76 moves forward and backward, the first lever 71 and the second lever 72 are opened/closed, and thereby the first hand 61 and the second hand 62 are switched between the opening state and the closing state. Driving of the actuator 76 is controlled by the control section 90. By the actuator 76 being driven based on a signal from the control section 90, the first hand 61 and the second hand 62 are opened/closed.

Each of the plurality of guides 63 arranged in the first hand 61 and the second hand 62 is a plate-shaped body. Some of the plurality of guides 63 are fixed to the first hand 61 by a first supporting body 64. The other of the plurality of guides 63 are fixed to the second hand 62 by a second supporting body 65. A material, which is elastically deformed when external force is applied thereto, is employed for the plurality of guides 63, the first supporting body 64 and the second supporting body 65. Stainless steel (SUS) is preferable, for example. Spacers 66 adapted to define intervals are arranged between the guides 63. The intervals between guides 63 are set slightly wider than a thickness of the guides 63 such that the guides 63 can engage with each other under the closing state. Each of the first hand 61 and the second hand 62 includes a pad 67 adapted to hold the fiber bundle F by friction.

Figure 4:
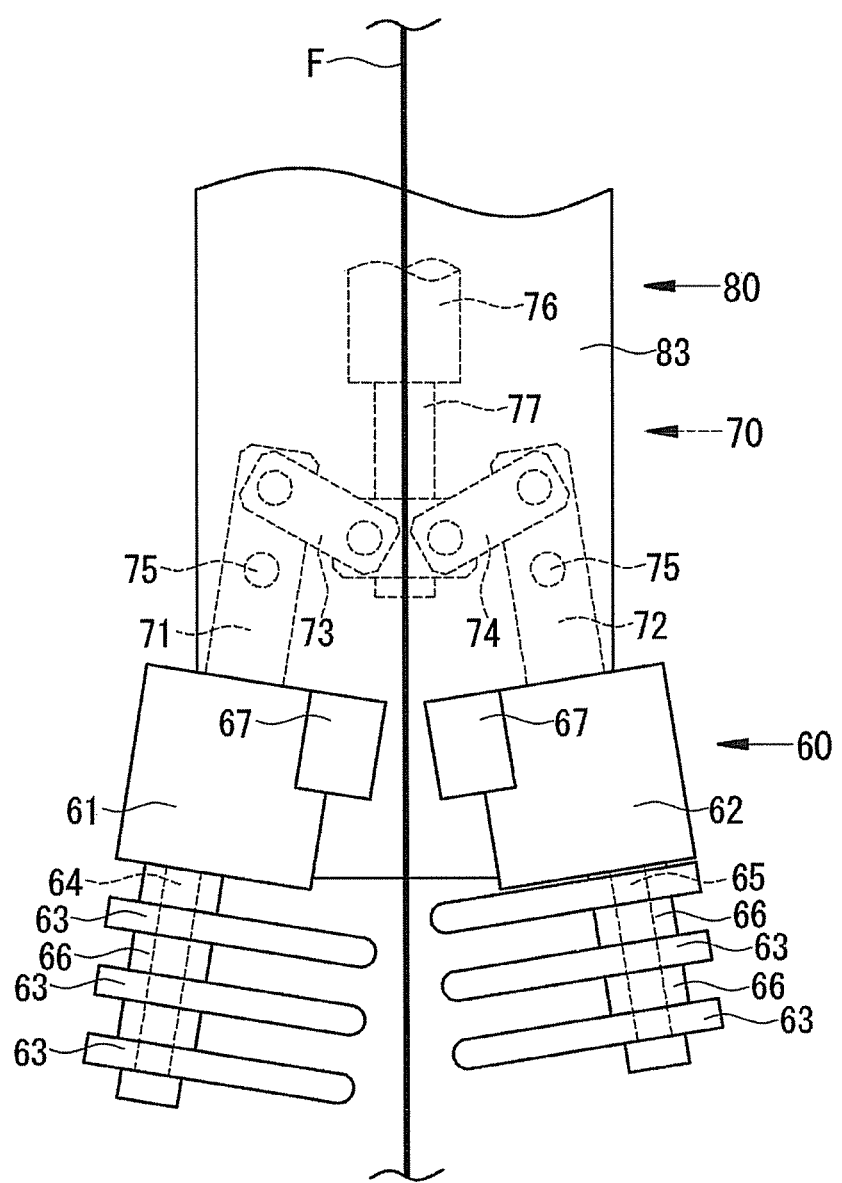
FIG. 4 is a front view illustrating an opening state of the chuck device.

As illustrated in FIG. 4, in a case of the opening state, the plurality of guides 63 of the first hand 61 and the second hand 62 are under a state where the engagement is released. Under this state, the fiber bundles F can be inserted between the first hand 61 and the second hand 62.

Figure 5:
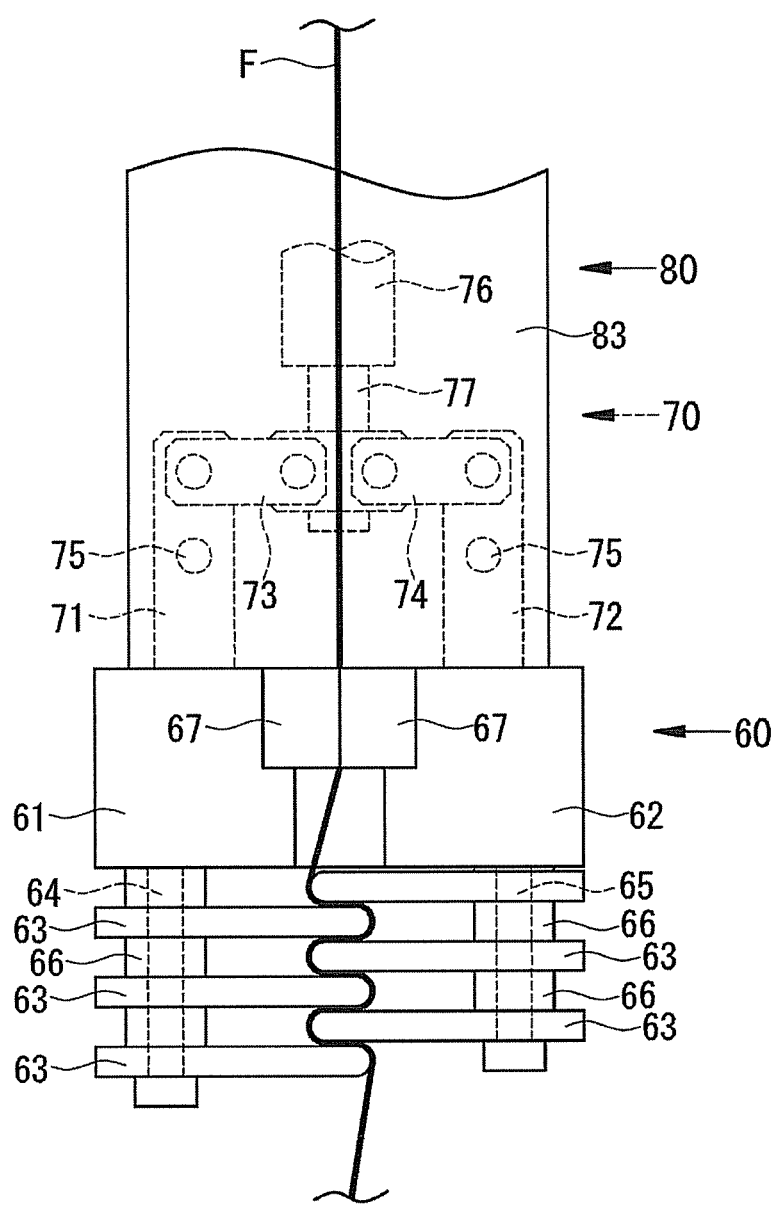
FIG. 5 is a front view illustrating a closing state of the chuck device.

FIG. 5 illustrates the closing state, which is a state where the fiber bundles F are inserted between the first hand 61 and the second hand 62. The plurality of guides 63 of the first hand 61 and the second hand 62 comes into a state of regulating and bending the fiber bundles F. Under the state illustrated in FIG. 5, since tension of the fiber bundles F is low, the plurality of guides 63, the first supporting body 64 and the second supporting body 65 are not elastically deformed.

Figure 6:
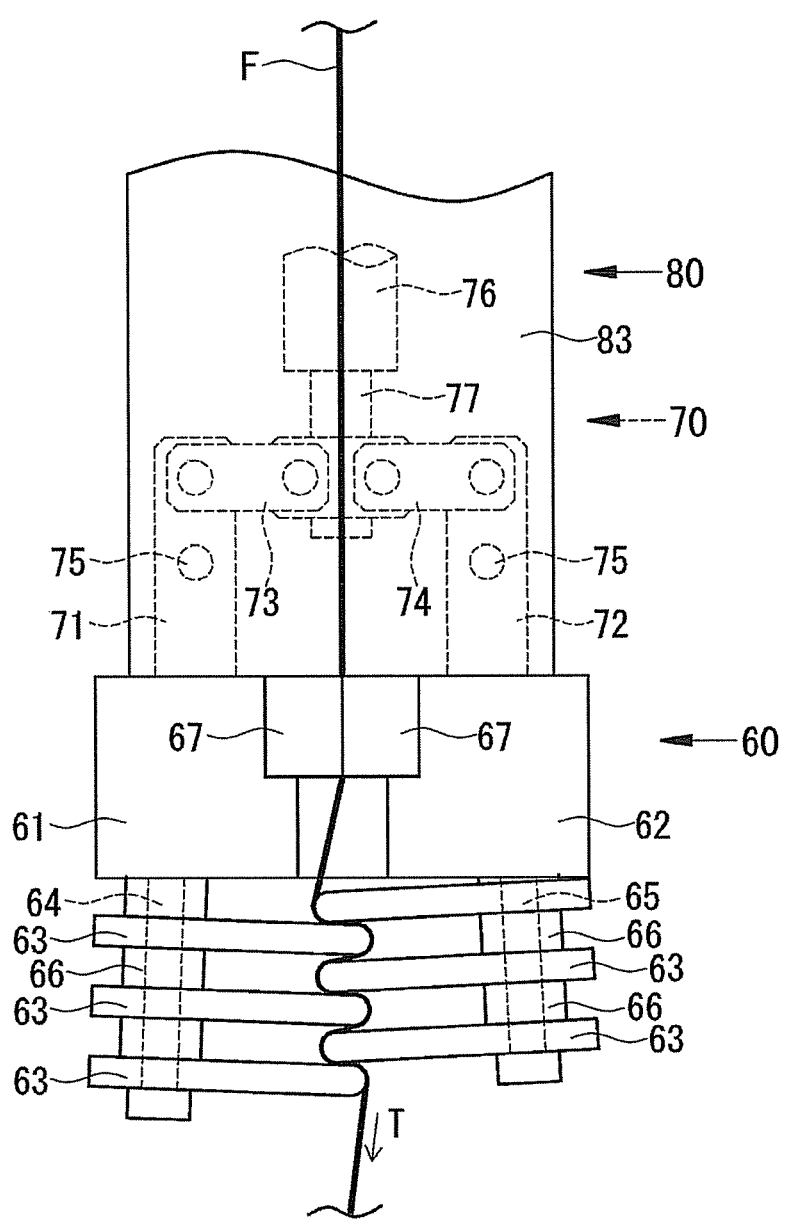
FIG. 6 is a front view illustrating a state where a tension is applied on fiber bundles under the opening state of the chuck device.

As illustrated in FIG. 6, when tension in a direction of an arrow T is applied on the fiber bundles F under the state of FIG. 5, the plurality of guides 63, the first supporting body 64 and the second supporting body 65 are elastically deformed. By the elastic deformation of the plurality of guides 63, the first supporting body 64 and the second supporting body 65, the guides 63 are close to each other to hold the fiber bundle F. Under a state where the tension is applied on the fiber bundles F, intervals between end portions of the plurality of guides 63, in particular, are narrowed and thereby the fiber bundles F are sandwiched by the guides 63 arranged side by side on a path of the fiber bundles F. When the closing state in FIG. 6 is shifted to the opening state in FIG. 4, the held fiber bundles F are released.

The arm 80 includes a first arm 81, a second arm 82 and a third arm 83. The first arm 81 is fixed to the second base 31. The second arm 82 is connected to the first arm 81 via an actuator. The second arm 82 is configured to be capable of moving in the front-back direction with respect to the first arm 81. The third arm 83 is connected to the second arm 82 via an actuator. The third arm 83 is configured to be capable of moving in an upper-lower direction with respect to the second arm 82. Driving of the arm 80 is controlled by the control section 90. Based on a signal from the control section 90, the actuators of the arm 80 are driven and thereby a position of the chuck device 51 is changed.

The arm 80 is capable of switching the position of the chuck device 51 to a first position PA, a second position PB and a third position PC. The first position PA is a position of the chuck device 51 mainly at the time of starting the hoop winding (see FIG. 2). The second position PB is a position where the fiber bundles F are caught by the chuck device 51 at the time of ending the hoop winding (see FIG. 12). The third position PC is a position of the chuck device 51 in the middle of the hoop winding and under a state where the hoop winding device 30 is retreated (see FIG. 10 and FIG. 15). The arm 80 is also capable of moving the chuck device 51 in the front-back direction.

Figure 13:
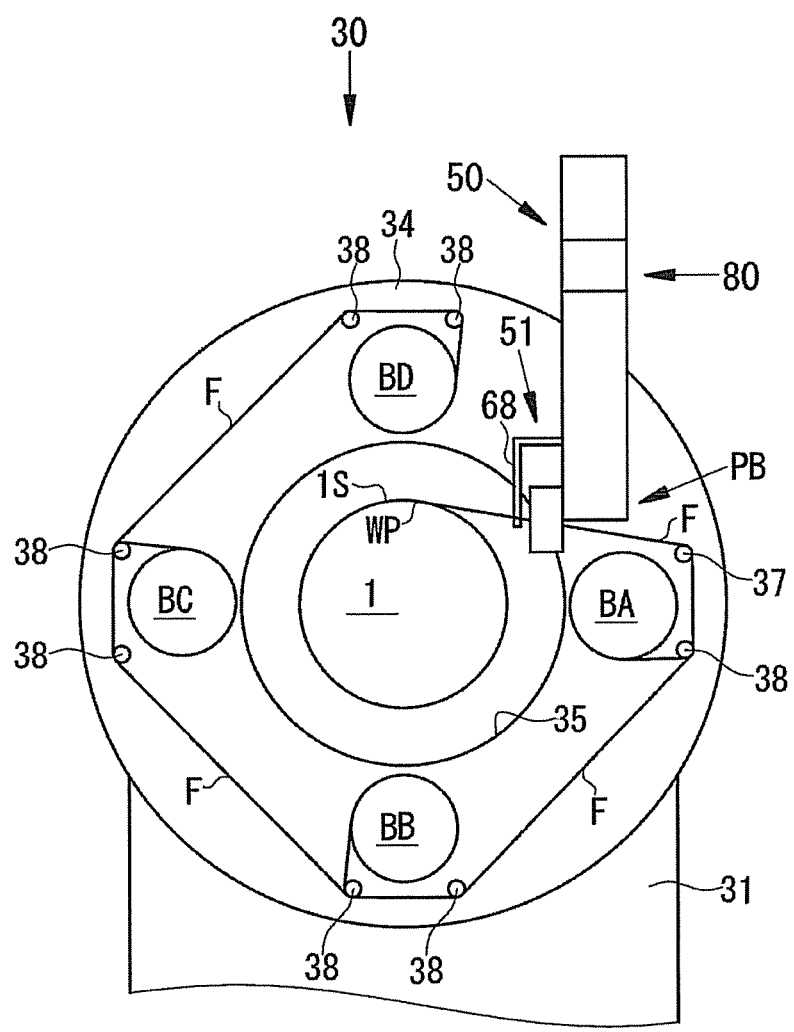
FIG. 13 is a view of the hoop winding device seen from an axial direction of the liner under a state where the fiber bundles are cut by a cutter.

The cutter 68 cuts the fiber bundles F supplied from the fiber supply guide 37 of the hoop winding head 34. As illustrated in FIG. 13, the cutter 68 is arranged in the third arm 83. When cutting the fiber bundle F, the cutter 68 projects out with respect to the third arm 83 to cut the fiber bundles F. When being under standby, the cutter 68 retreats to a position not being in contact with the fiber bundles F.

Next, operation of the handling device 50 in the hoop winding of the FW apparatus 100 having the above-described configuration will be described. The liner 1 is mounted to the liner transfer device 20, and the hoop winding is performed following the helical winding performed previously. Thereafter, the helical winding is performed again. Winding conditions of the hoop winding, that is, the winding conditions such as a movement speed of the hoop winding device 30, a rotation speed of the hoop winding head 34, the number of times the hoop winding device 30 is reciprocated, and moved distance of the hoop winding device 30, are input to the control section 90 in advance by an operator. The control section 90 controls the driving of the hoop winding device 30 in the following manner based on the input winding conditions.

As illustrated in FIG. 2, a position (a position in a rotation direction) of when the hoop winding head 34 is stopped is set such that the chuck device 51 is positioned between the bobbin BA and the bobbin BD. The position of the hoop winding head 34 in the rotation direction will be hereinafter referred to as a processing stop position.

When the helical winding before the hoop winding is finished, as illustrated in FIG. 1, the hoop winding device 30 is moved along the front-back direction of the FW apparatus 100 from a standby position (see FIG. 16) to move to a position to start the hoop winding. In the present embodiment, the hoop winding is started from one end of a tubular portion of the liner 1. When the hoop winding device 30 is moved, the hoop winding head 34 has a process suspension posture. The chuck device 51 is at the third position PC (see FIG. 15). The chuck device 51 grips the fiber bundles F supplied from the fiber supply guide 37 of the hoop winding head 34.

Figure 7:
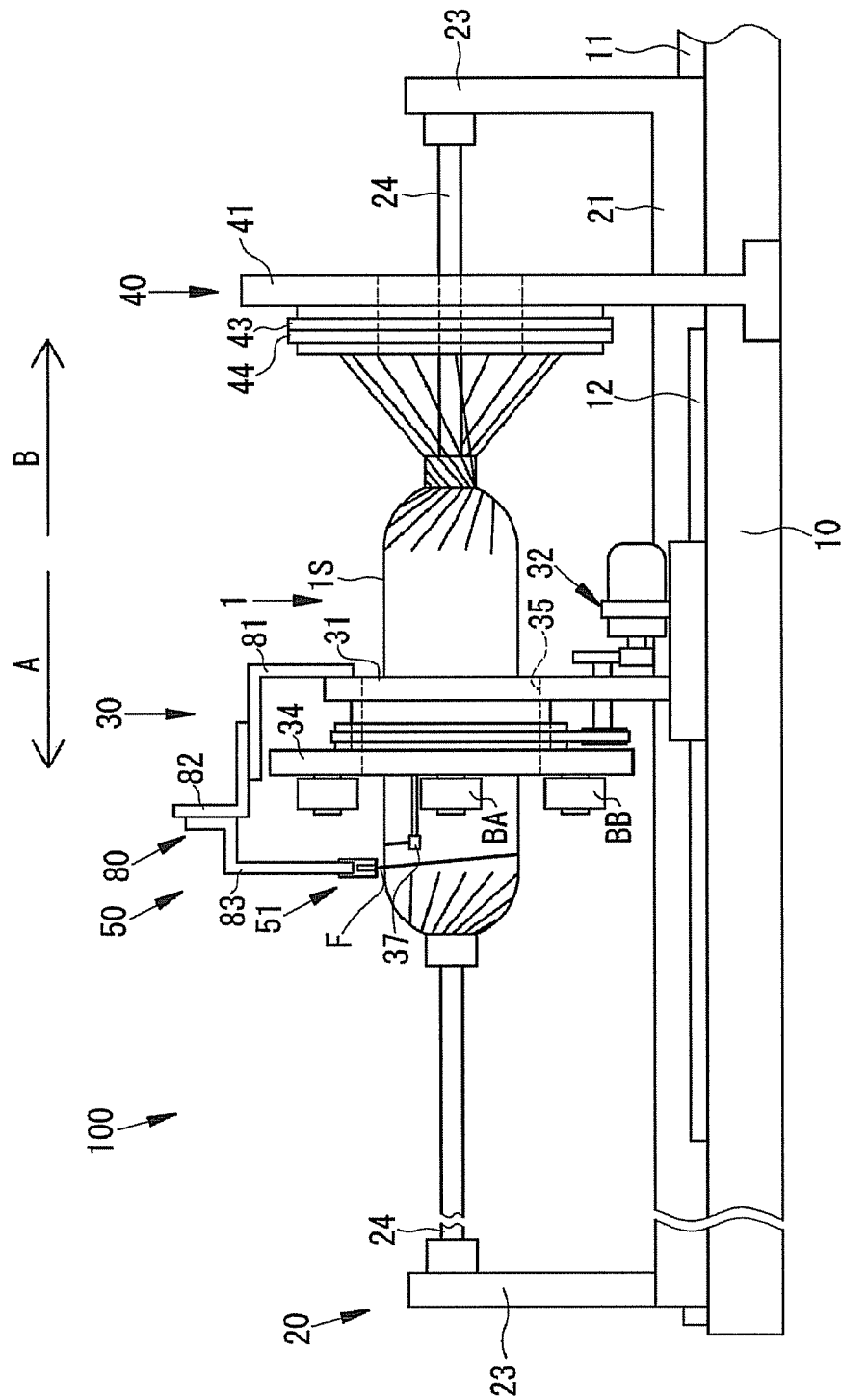
FIG. 7 is a side view of the FW apparatus illustrating a state where the hoop winding device starts winding.

As illustrated in FIG. 1 and FIG. 2, when the hoop winding device 30 reaches the position (a winding start position) to start the hoop winding, as illustrated in FIG. 7 and FIG. 8, the chuck device 51 is moved to the first position PA.

The hoop winding device 30 starts the winding of the fiber bundles F. For the first few windings, the tension of the fiber bundle F is set lower than a prescribed tension, and under this state, next fiber bundles F are wound so as to overlap the fiber bundles F wound underneath. Alternatively, the next fiber bundles F are wound so as to intersect the fiber bundles F wound underneath. At this time, if a position of the chuck device 51 in the front-back direction with respect to the hoop winding head 34 is fixed, the chuck device 51 interferes with the fiber bundles F or the rotating fiber supply guide 37. Thus, the arm 80 is driven such that the chuck device 51 is gradually located away from the hoop winding head 34. At this time, a position of the chuck device 51 in the front-back direction with respect to the liner 1 is not changed. After winding the first few windings, the tension is set to the prescribed tension and the hoop winding is carried out. The chuck device 51 is under the opening state, and the fiber bundles F are released.

Figure 9:
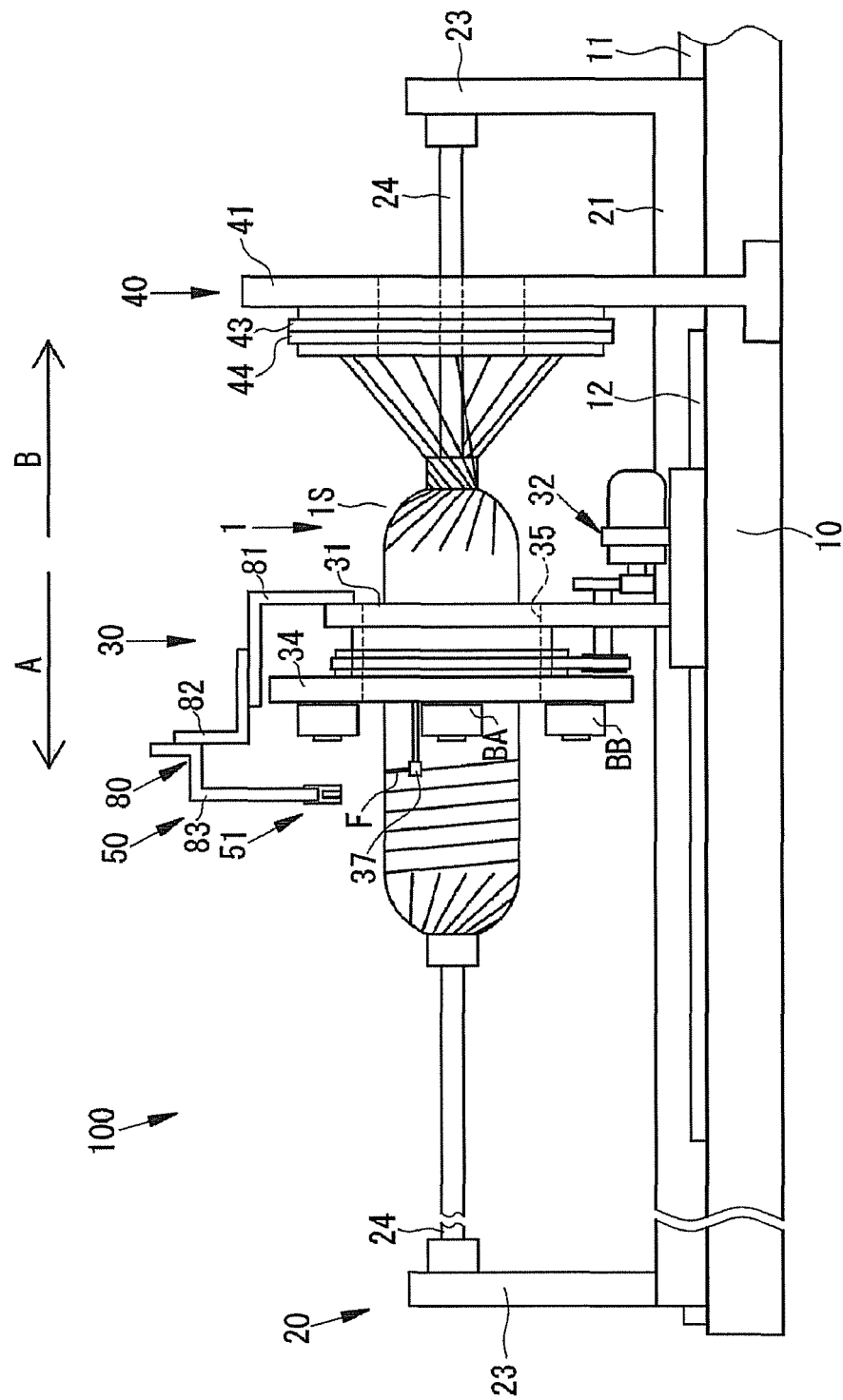
FIG. 9 is a side view of the FW apparatus illustrating a state where the hoop winding device is carrying out hoop winding.
Figure 10:
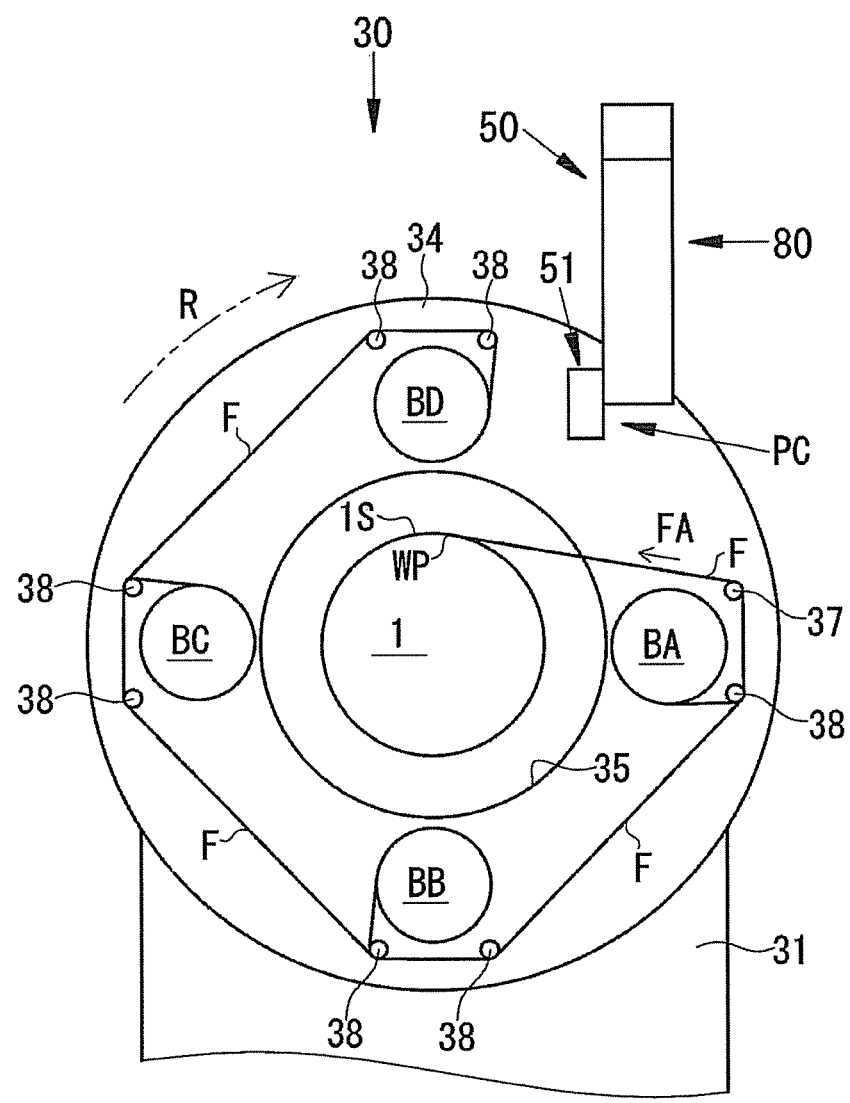
FIG. 10 is a view of the hoop winding device seen from the front direction of the liner under a state of FIG. 9.

As illustrated in FIG. 9 and FIG. 10, since the hoop winding device 30 moves in a right direction on a page of FIG. 9 while rotating the hoop winding head 34, the fiber bundles F are hoop wound around the outer circumferential surface 1S of the tubular portion. A first hoop winding layer is formed under this state. Subsequently, the hoop winding device 30 is reversely moved to form a second hoop winding layer on an outer surface of the previous hoop winding layer. In a case of further forming a hoop winding layer, the hoop winding is carried out a required number of times by reciprocating the hoop winding device 30.

Figure 11:
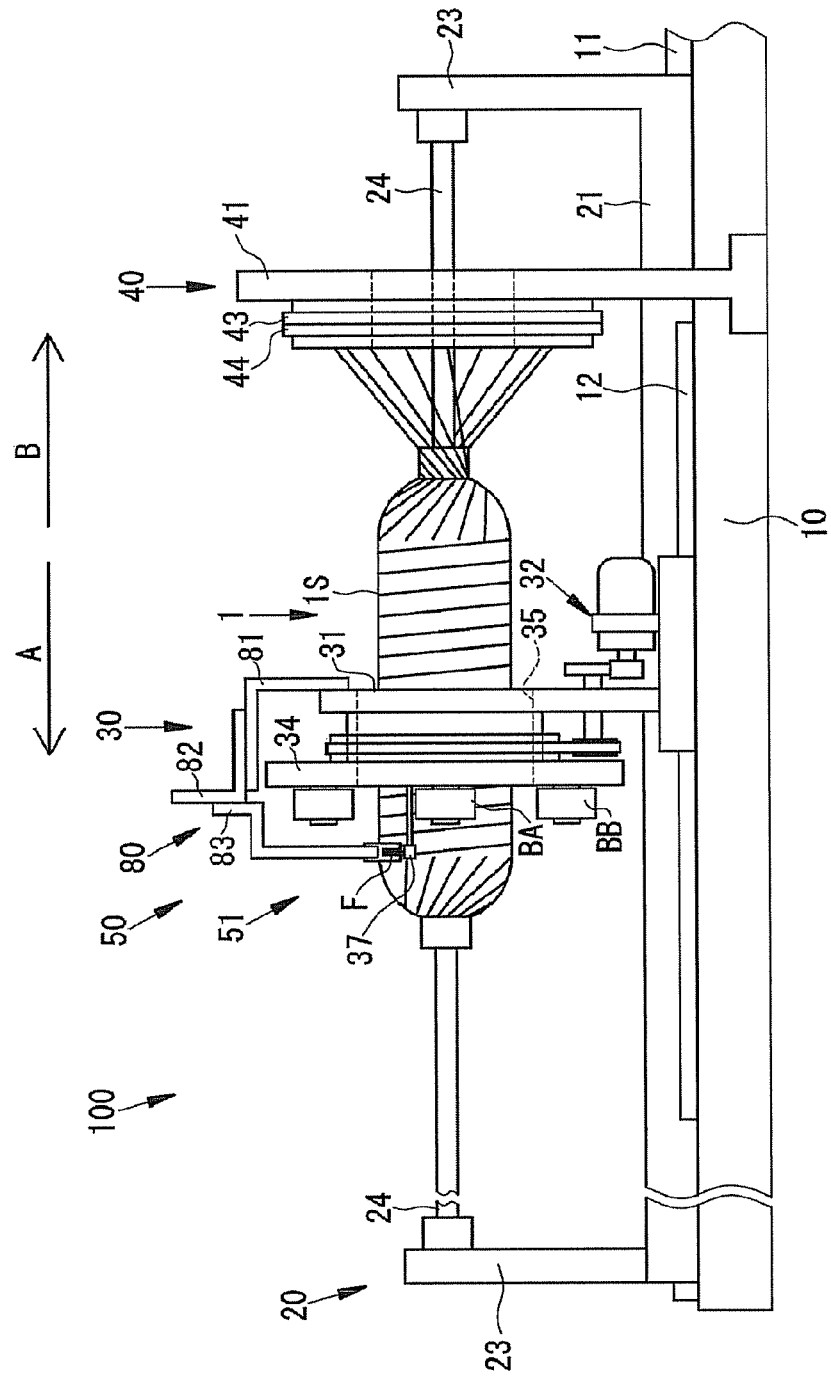
FIG. 11 is a side view of the FW apparatus illustrating a state where the hoop winding device ends winding of the fiber bundles and the chuck device is holding the fiber bundles.
Figure 12:
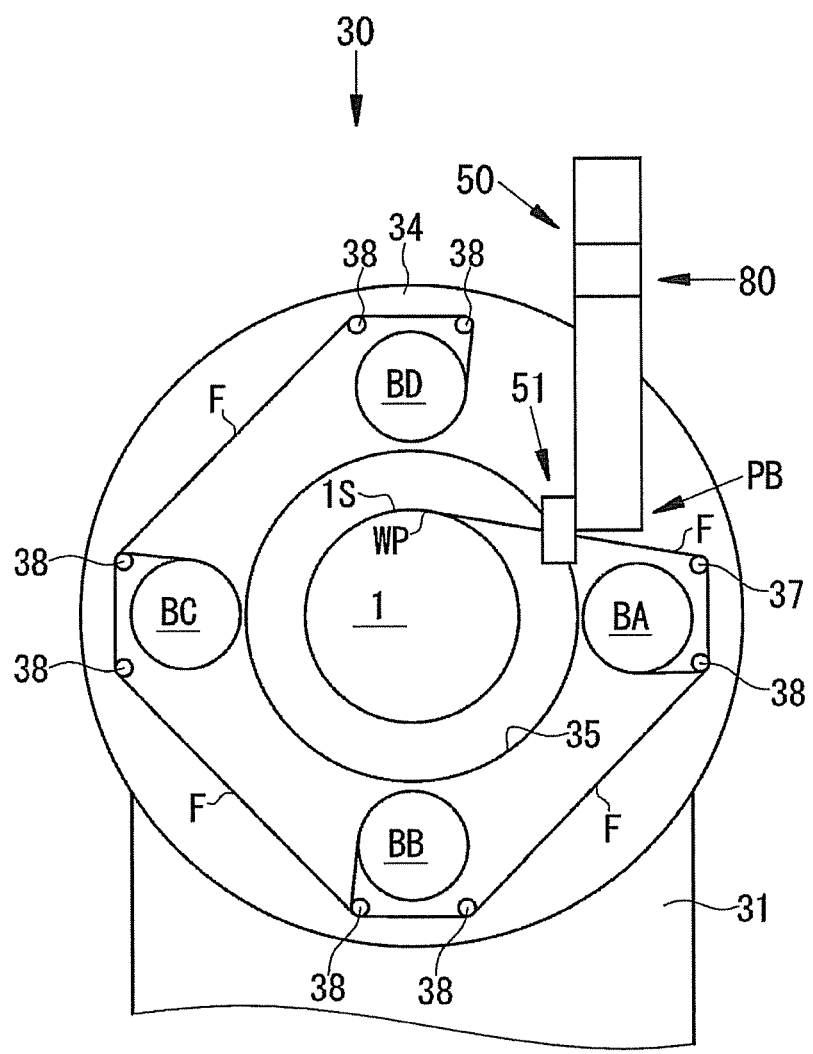
FIG. 12 is a view of the hoop winding device seen from the front direction of the liner under a state of FIG. 11.

After the hoop winding of the required number of times is finished, as illustrated in FIG. 11 and FIG. 12, the hoop winding head 34 is stopped in the processing suspension posture. The chuck device 51 moves from the first position PA towards the second position PB. The chuck device 51 is brought close to the fiber bundles F supplied from the fiber supply guide 37 of the hoop winding head 34 with the chuck device 51 opened. When the fiber bundles F are caught between the first hand 61 and the second hand 62, the chuck device 51 is brought into the closing state to grip the fiber bundles F. A position where the fiber bundles F are gripped is between the fiber supply guide 37 and the winding position WP of the fiber bundles F.

As illustrated in FIG. 13, when the fiber bundles F are fixed to the fiber bundles F previously wound in the hoop winding, the cutter 68 projects out. The cutter 68 cuts the fiber bundles F downstream in the fiber supply direction FA of a position where the chuck device 51 holds the fiber bundle F. The hoop-wound fiber bundle F is thereby separated from the bobbins BA, BB, BC and BD at an ending position of the hoop winding.

Figure 14:
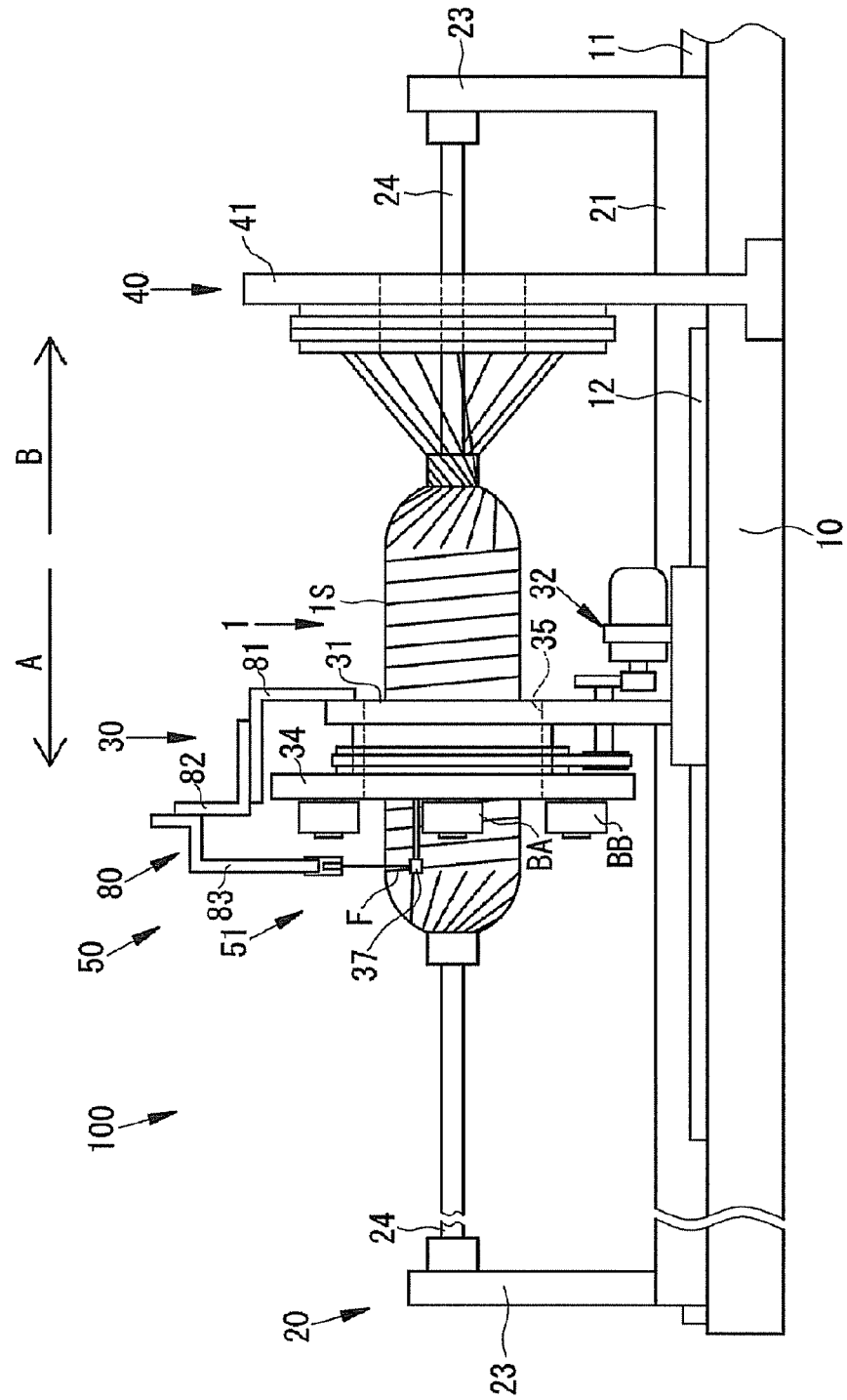
FIG. 14 is a side view of the FW apparatus illustrating a state where the hoop winding device ends the hoop winding and the chuck device is holding the fiber bundles.
Figure 15:
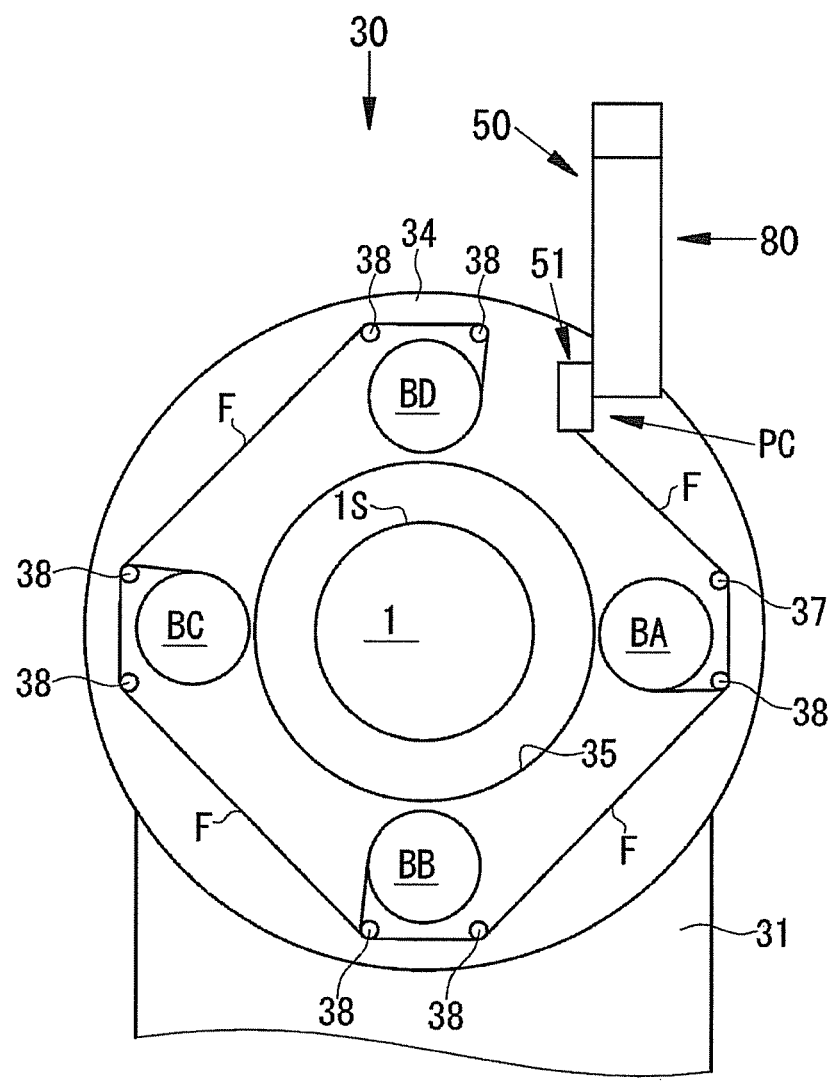
FIG. 15 is a view of the hoop winding device seen from the front direction of the liner under a state of FIG. 14.
Figure 16:
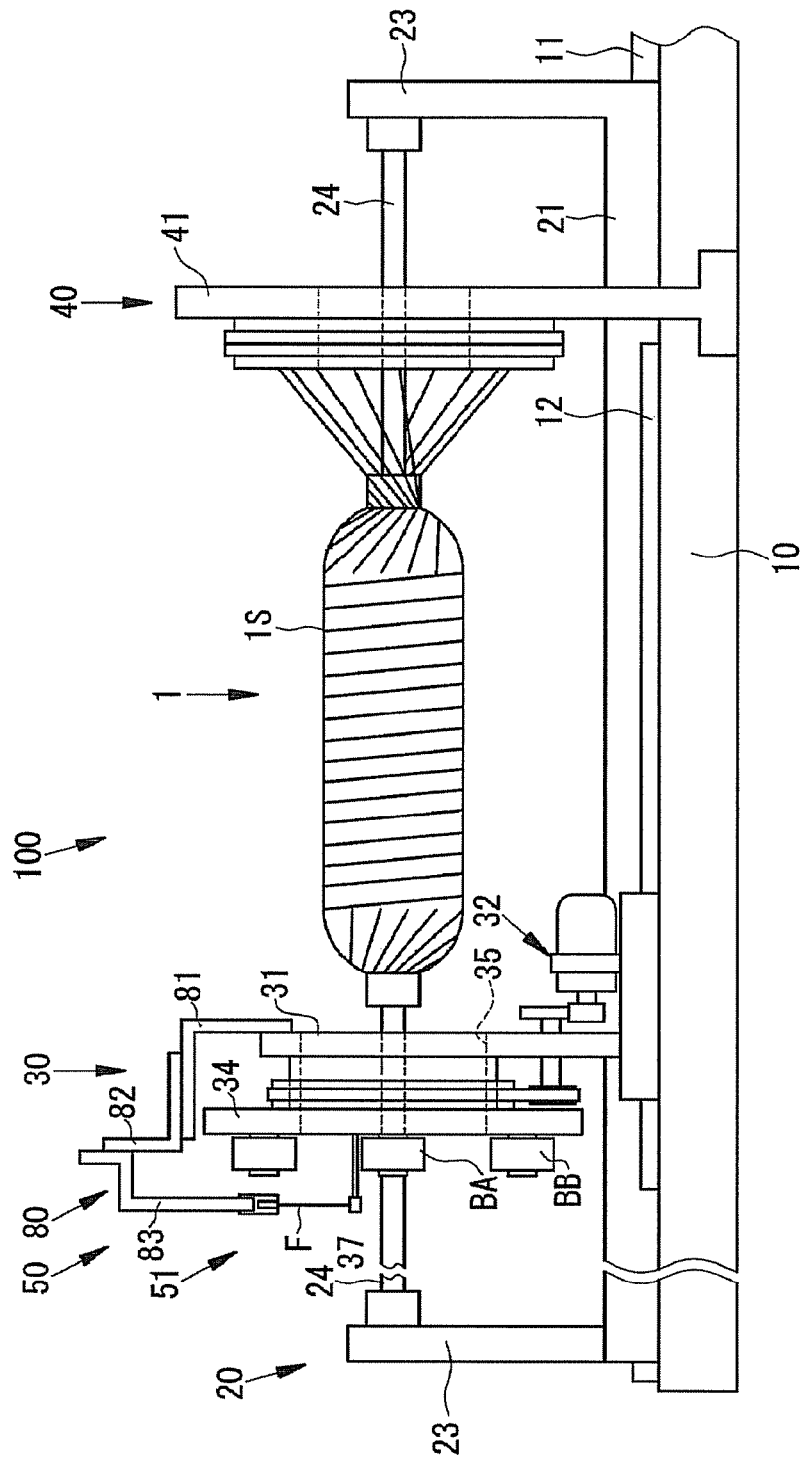
FIG. 16 is a side view of the FW apparatus illustrating a state where the hoop winding device is moved to a standby position.

When the cutter 68 cuts the fiber bundles F in FIG. 14 and FIG. 15, the chuck device 51 moves from the second position PB towards the third position PC as illustrated in FIG. 11. The chuck device 51 grips the fiber bundles F supplied from the fiber supply guide 37 of the hoop winding head 34. As illustrated in FIG. 16, the hoop winding device 30 is moved along the front-back direction of the FW apparatus 100 from the ending position of the hoop winding to the standby position. The chuck device 51 is under standby at this position until the next helical winding is finished. Then, if the hoop winding is to be again carried out, the next hoop winding is carried out from the state illustrated in FIG. 1 and FIG. 6.

The chuck device 51 and the hoop winding device 30 according to the present embodiment described above has the following effects.

The plurality of guides 63 of the chuck device 51 holds the fiber bundles F by being close to each other with the tension applied on the fiber bundles F under the closing state. Since the fiber bundles F are held by use of the tension applied on the fiber bundles F, in a case where the tension applied on the fiber bundles F is high, a force of holding the fiber bundles F is enhanced accordingly. The fiber bundle F thus can be firmly held.

The plurality of guides 63 of the chuck device 51 are close to each other by the first supporting body 64 and the second supporting body 65 being elastically deformed with the tension applied on the fiber bundles F under the closing state. Thus, the force of holding the fiber bundle F can be enhanced according to the tension applied on the fiber bundle F.

The hand 60 of the chuck device 51 includes the pad 67 adapted to hold the fiber bundles F by friction. The fiber bundles F thus can be further firmly held.

Embodiments of the present invention have been described above, but the present invention is not limited to the embodiments described above, and various modifications can be made. For example, a positional relationship between the hoop winding head 34 and the handling device 50 is not limited to a positional relationship illustrated in FIG. 1 and merely needs to be a positional relationship in which the hoop winding head 34 and the handling device 50 do not interfere with each other and the fiber bundles F supplied from the fiber supply guide 37 of the hoop winding head 34 can be gripped. If structure or arrangement of the hoop winding head 34 and the handling device 50 are different, the positional relationship is different.

While the present invention has been described with respect to embodiments thereof, it will be apparent to those skilled in the art that the disclosed invention may be modified in numerous ways and may assume many embodiments other than those specifically set out and described above. Accordingly, the appended claims cover all modifications that fall within the true spirit and scope of the present invention.

What is claimed is:

1. A chuck device of a fiber bundle comprising a pair of hands adapted to be opened/closed, wherein
   the pair of hands includes a plurality of guides adapted to regulate and bend the fiber bundle under a closing state and to release the fiber bundle under an opening state,
   under the closing state, the plurality of guides is adapted to hold the fiber bundle by being close to each other with tension applied on the fiber bundle,
   the pair of hands includes supporting bodies adapted to support the plurality of guides,
   under the closing state, the guides are close to each other by the supporting bodies being elastically deformed with the tension applied on the fiber bundle, and
   the pair of hands further includes a pad adapted to hold the fiber bundle by friction.

2. A hoop winding device comprising the chuck device according to claim 1, the hoop winding device being adapted to rotate about a resting liner around which the fiber bundle is wound and to support in a freely rotating manner, a bobbin around which the fiber bundle is wound.

3. The hoop winding device according to claim 2, wherein
   the hoop winding device is capable of supporting a plurality of the bobbins, and
   the chuck device is adapted to simultaneously grip a plurality of the fiber bundles for hoop winding.

4. The hoop winding device according to claim 3, further comprising a cutter adapted to cut the fiber bundles for the hoop winding gripped by the chuck device.

5. The hoop winding device according to claim 2, further comprising a cutter adapted to cut the fiber bundle for hoop winding gripped by the chuck device.

6. A hoop winding device comprising the chuck device according to claim 1, wherein the hoop winding device is adapted to rotate about a resting liner around which the fiber bundle is wound and to support in a freely rotating manner, a bobbin around which the fiber bundle is wound.

7. The hoop winding device according to claim 6, wherein
   the hoop winding device is capable of supporting a plurality of the bobbins, and
   the chuck device is adapted to simultaneously grip a plurality of the fiber bundles for hoop winding.

8. The hoop winding device according to claim 7, further comprising a cutter adapted to cut the fiber bundles for the hoop winding gripped by the chuck device.

9. The hoop winding device according to claim 6, further comprising a cutter adapted to cut the fiber bundle for hoop winding gripped by the chuck device.

10. A chuck device of a fiber bundle comprising a pair of hands adapted to be opened/closed, wherein
    the pair of hands includes a plurality of guides adapted to regulate and bend the fiber bundle under a closing state and to release the fiber bundle under an opening state,
    under the closing state, the plurality of guides is adapted to hold the fiber bundle by being close to each other with tension applied on the fiber bundle, and
    the pair of hands further includes a pad adapted to hold the fiber bundle by friction.

11. A hoop winding device comprising the chuck device according to claim 10, wherein the hoop winding device is adapted to rotate about a resting liner around which the fiber bundle is wound and to support a bobbin in a freely rotating manner, around which the fiber bundle is wound.

12. The hoop winding device according to claim 11, wherein
    the hoop winding device is capable of supporting a plurality of the bobbins, and
    the chuck device is adapted to simultaneously grip a plurality of the fiber bundles for hoop winding.

13. The hoop winding device according to claim 12, further comprising a cutter adapted to cut the fiber bundles for the hoop winding gripped by the chuck device.

14. The hoop winding device according to claim 11, further comprising a cutter adapted to cut the fiber bundle for hoop winding gripped by the chuck device.

* * * * *